United States Patent
Laine et al.

(10) Patent No.: US 7,548,600 B2
(45) Date of Patent: Jun. 16, 2009

(54) APPARATUS AND METHOD FOR COMPENSATING THE DRIFT OF A LOCAL CLOCK USED AS SAMPLING FREQUENCY

(75) Inventors: Jérôme Laine, Sautron (FR); Jean-Paul Menard, Pornic (FR)

(73) Assignee: Sercel, Carquefou (FR)

(*) Notice: Subject to any disclaimer, the term of this patent is extended or adjusted under 35 U.S.C. 154(b) by 680 days.

(21) Appl. No.: 11/268,738

(22) Filed: Nov. 8, 2005

(65) Prior Publication Data

US 2007/0025484 A1 Feb. 1, 2007

(30) Foreign Application Priority Data

Jul. 28, 2005 (FR) .................................. 05 08071

(51) Int. Cl.
*H04L 27/08* (2006.01)
(52) U.S. Cl. ..................................................... 375/355
(58) Field of Classification Search ............... 375/355, 375/371
See application file for complete search history.

(56) References Cited

U.S. PATENT DOCUMENTS

| | | | |
|---|---|---|---|
| 5,761,259 A * | 6/1998 | Dingsor | ................. 375/285 |
| 6,002,640 A | 12/1999 | Harmon | |
| 6,253,156 B1 | 6/2001 | Bui-Tran et al. | |
| 2002/0193947 A1 | 12/2002 | Chamberlain | |
| 2003/0068977 A1 * | 4/2003 | King | .................. 455/12.1 |

FOREIGN PATENT DOCUMENTS

WO WO 98/52072 A1 11/1998

* cited by examiner

*Primary Examiner*—Kevin Y Kim
(74) *Attorney, Agent, or Firm*—Law Office of Tim Cook PC

(57) ABSTRACT

The invention relates to an apparatus and a method for data acquisition, the apparatus being characterized in that it comprises an analog/digital converter (510) sampling at an imperfect frequency $F_E$ provided by a local clock (100) data acquired by a sensor (500) thus providing a series of sampled and dated data E[k], a time-stamping module (300) for measuring the frequency error of the local clock (100) by determining the sampling dates according to a universal time UTC (t), and a resampling module (400) for correcting the sampled and dated data E[k].

15 Claims, 2 Drawing Sheets

…

Figure 1:
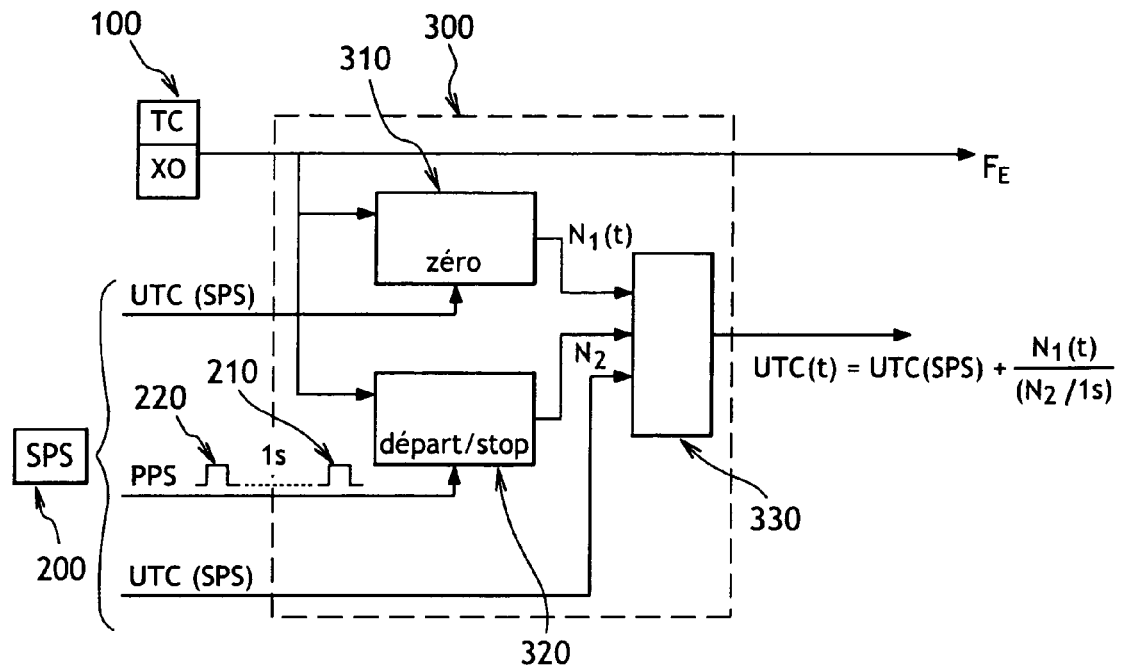

APPARATUS AND METHOD FOR COMPENSATING THE DRIFT OF A LOCAL CLOCK USED AS SAMPLING FREQUENCY

The invention relates to an apparatus and a method for data acquisition.

The invention relates in particular to an apparatus and a method for seismic data acquisition, the apparatus being intended to form a node of a wireless network of seismic sensors.

More accurately, the present invention relates to a seismic data acquisition apparatus in which each apparatus or seismic sensor is equipped with a satellite-based positioning system, with an analog/digital converter whose acquisition data are compensated by means of a satellite-based positioning system.

A person skilled in the art will be aware of numerous data acquisition apparatuses and methods intended to be implemented within a data acquisition network.

In the case where the data acquisition network is formed of an assembly of seismic sensors, these devices are conventionally and usually constituted by sensors linked together in groups, by wires or cables, to a "node" of the network. These nodes are generally organized in groups around a "concentrator", and a group of nodes forms, with its concentrator, a subnetwork, the links between the concentrator and the nodes also being wire links. The concentrators locally manage the subnetwork of nodes, provide the power supply and centralize the data. The concentrators are connected to a local computer network, likewise a wire network, to which is connected a Central Unit which drives the assembly and records the data originating from the subnetworks. These conventional solutions are well known to the person skilled in the art and will not be described in detail hereinbelow.

The person skilled in the art has also proposed wireless data acquisition networks which have the obvious advantage of avoiding the use of numerous cables. In the case of seismic applications, these networks are also formed of nodes, of concentrators and of a Central Unit according to an organization in accordance with what is described hereinabove, the communication between these various elements of the network being performed by RF in radio mode. In these wireless data acquisition networks, it is necessary to provide specific means so that a time reference at the level of each node of the network can be known and can be common to the various nodes of the network so as to obtain acquisition data with good temporal accuracy, this common time reference obviously no longer being provided by way of wires or cables linking the nodes together and to a common reference clock.

In these wireless data acquisition networks, the time reference at the level of each node can be known by means of a Satellite-Based Positioning System (SPS) which is usually the GPS system (standing for the expression "Global Positioning System") installed in each of the nodes of the network. The nodes are thus synchronized with one another to the universal time provided by the satellite-based positioning system. When, in a cabled network of seismic sensors, a data acquisition order is issued from the central unit to the nodes of the network at a date $t_0$ serving as reference date, there is a shift called the phase error between this date $t_0$ and the date $t_{k,i}$ associated with a node i of the network and at which a sample k leaves an analog converter included in the node i. This phase error is related to the uncertainty in the propagation times of the acquisition order to the nodes.

Document U.S. Pat. No. 6,253,156 proposes a solution, dedicated to seismic applications, for correcting these phase errors and allowing accuracy indispensable to the quality of the measurements carried out. To do this, the device presented in this document makes provision for a digital filter able to compensate a series of acquisition data x[n] emanating from an analog/digital converter of a node i of the network and acquired starting from an initial instant $t_{k,i}$ as a series of acquisition data y[n] readjusted with respect to the reference date $t_0$, thus making it possible to correct the phase error only (resynchronization). The frequency error is assumed to be zero, this being the case in a cabled network where the sampling frequency is transmitted gradually (syntonization).

In a wireless network of seismic sensors, this gradual syntonization cannot be done and it is thus appropriate either to use an oscillator whose frequency is extremely stable (always a very costly solution) or to find an external time reference that may possibly be the GPS for example to which the oscillator can be slaved.

This second approach requires the use of oscillators whose frequency, corresponding to the sampling frequency, is permanently slaved to the information provided by the satellite-based positioning system. The frequency of the oscillator is then synchronized with the satellite-based positioning system. Such is the case in particular in document U.S. Pat. No. 6,253,156. To do this, these oscillators must be included in a closed-loop device of analog type (PLL/VCXO) or of digital type (NCO) so as to ensure the adaptation of the sampling frequency, said device forming a syntonization device.

This type of system is expensive in terms of energy consumed on account of the fact that the satellite-based positioning system must be turned on for the entire duration of the data acquisition, without which the frequency of the oscillator cannot be adjusted in such a way as to be synchronized with the satellite-based positioning system. The considerable consumption of such a satellite-based positioning system strongly affects the autonomy of the nodes, whose battery has to be recharged often. Additionally, these oscillators and the frequency adaptation loops associated with these oscillators are expensive systems.

An objective of the present invention is therefore to propose an apparatus and a method in which the oscillator is an inexpensive oscillator not requiring a device for syntonization with the positioning system.

Another objective of the present invention is to propose an apparatus and a method making it possible to obtain accurate acquisition data while minimizing energy consumption.

These objectives are achieved within the framework of the present invention by virtue of a method of data acquisition comprising the steps consisting in:

sampling acquisition data at an imperfect sampling frequency $F_E$ provided by a local clock, thus forming a series of sampled and dated data;

measuring the frequency error of the local clock by determining the sampling dates according to a universal time;

correcting the sampled and dated data.

These objectives are also achieved within the framework of the present invention by virtue of a data acquisition apparatus, characterized in that it comprises an analog/digital converter sampling at an imperfect frequency provided by a local clock data acquired by a sensor thus providing a series of sampled and dated data, a time-stamping module for measuring the frequency error of the local clock by determining the sampling dates according to a universal time, and a resampling module for correcting the sampled and dated data.

Figure 2:
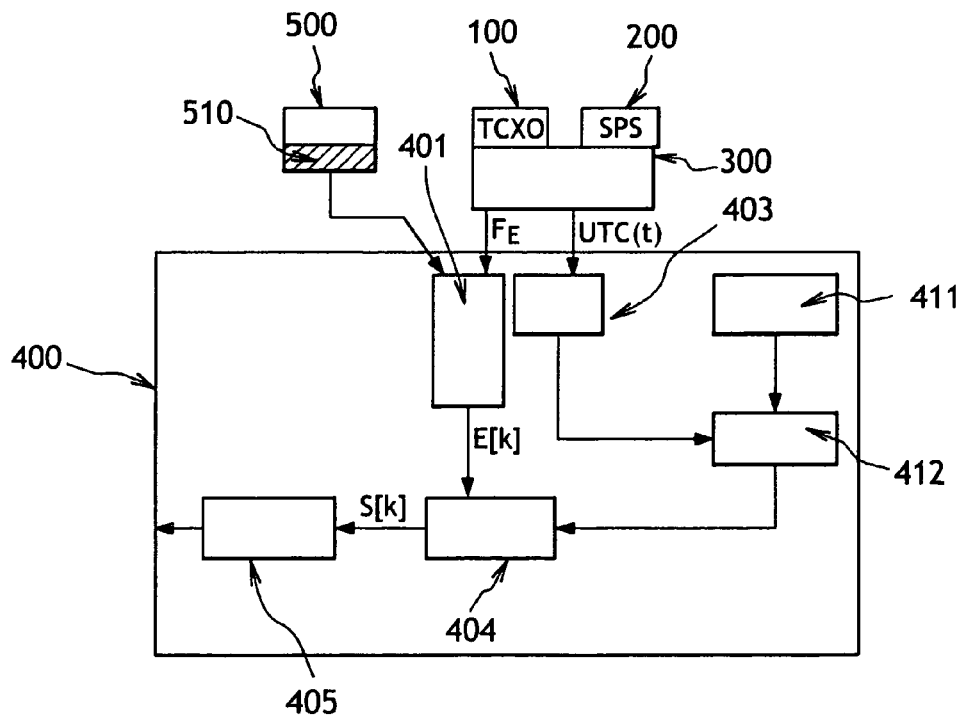
Figure 3A:
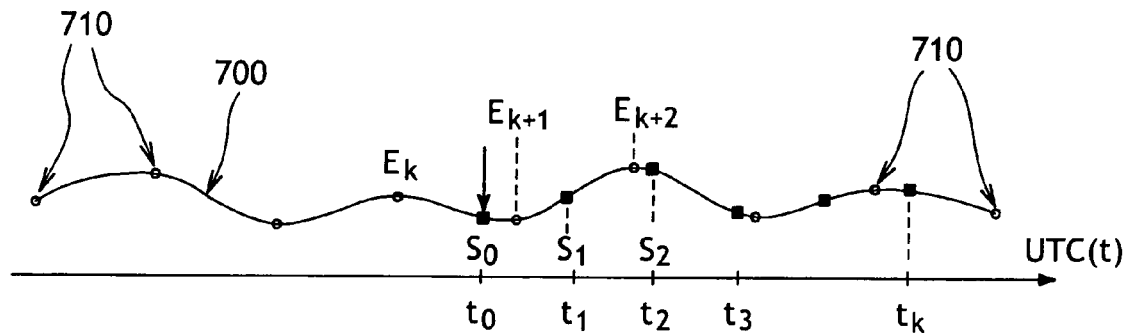
Figure 3B:
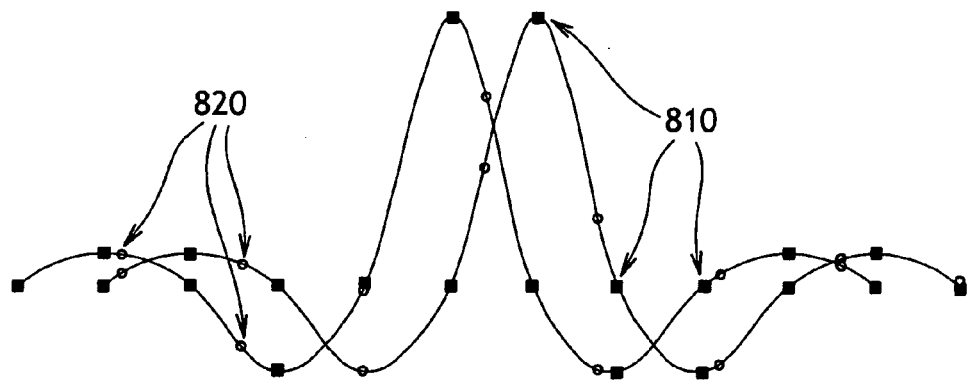

Other characteristics, aims and advantages of the present invention will become apparent on reading the detailed description which follows, and in conjunction with the appended drawings, given by way of nonlimiting examples and in which;

FIG. 1 presents a device for sampling a local clock by a satellite-based positioning system in accordance with the present invention making it possible to provide a very accurate clock on the basis of a somewhat inaccurate oscillator (frequency errors corrected);

FIG. 2 presents a device for compensating the phase error and sampling frequency;

FIG. 3a and FIG. 3b present the principle of operation of a resampler on acquisition data, according to a preferential embodiment.

The originality of the present invention lies in the fact that the oscillator (providing a clock signal for the sampling of the acquisition data) is not synchronized with the satellite-based positioning system but gauged to this satellite-based positioning system.

FIG. 1 presents a device for gauging the operating frequency (sampling frequency) of a TCXO oscillator, included in an apparatus in accordance with the invention, by a satellite-based positioning system, the gauging device also ensuring a gauging of the time provided by a local clock. The role of the satellite-based positioning system is to provide a reference clock during the gauging of the local clock. This apparatus is intended to form a node of the data acquisition network.

In the device of the present invention the TCXO oscillator used is a low cost oscillator whose operating frequency is not stable enough for seismic data acquisition applications. Specifically, the clock signal thus generated by a TCXO oscillator exhibits a drift of the order of 10 ppm i.e. 10 μs/second. Now, in such applications, the mutual synchronization of the nodes must be better than 10 μs. It is therefore necessary to gauge this drift in relation to a reference time given by an SPS satellite-based positioning system 200 included in the node, without which the device can provide usable data only over a maximum duration of one second. In the absence of gauging, it would be necessary to provide an accurate time reference every second, in other words to leave the satellite-based positioning system on so that it can provide this accurate time reference every second.

In a general manner, in the embodiment presented in support of FIG. 1, a time-stamping module 300 comprises means 310, 320 and 330 which cooperate. A first counter 310 makes it possible to maintain an approximate time from the last call to a satellite-based positioning system 200 by counting the number of periods of the TCXO oscillator which forms a local clock 100. The satellite-based positioning system 200 provides an accurate date UTC(SPS) which is reset to zero each time that the system is powered up. This approximate time is corrected by a second counter 320 which calculates and stores the frequency error of the local clock 100. The combining of the means 310 and 320, performed by an operator 330, makes it possible to maintain an exact time between two calls to the satellite-based positioning system 200. The duration of validity depends on the accuracy of the frequency measurement performed by the second counter 320.

In a more detailed manner, at each activation of the satellite-based positioning system 200, the first counter 310 of the time-stamping stamping module 300 meters the number $N_1$ of periods of the local clock 100 since the date UTC(SPS) provided by the reference clock of the satellite-based positioning system 200 to the first counter 310. This date UTC(SPS) is again provided at each activation of the satellite-based positioning system.

The local clock 100 providing an approximate time on the one hand and the reference clock of the satellite-based positioning system 200 and the local clock 100 not being syntonized on the other hand, there is an uncertainty in the estimation of the time provided by the first counter 310 on the basis of the local clock 100 on account of the lack of frequency stability of this local clock 100. In particular, there is an uncertainty in the measurement of the sampling frequency $F_E$ of the data acquired.

To circumvent this uncertainty, it is necessary to perform a gauging of the frequency of the local clock 100, and the time-stamping module 300 therefore provides a second counter 320. The second counter 320 meters the number $N_2$ of periods of the local clock 100 over a duration of 1 s separating two signals 210 and 220 provided by the satellite-based positioning system 200. Being provided by the reference clock of the satellite-based positioning system, this duration of 1 s is very accurate, hence exhibiting very low uncertainty. These two successive signals 210 and 220 separated by 1 s form a reference signal PPS of the satellite-based positioning system. The number $N_2$ is thus dimensionally equivalent to a frequency, which corresponds to that of the local clock 100.

The uncertainty of this gauging therefore defines a limit of validity which makes it necessary to call regularly upon the satellite-based positioning system when this gauging is no longer valid.

Specifically, over this duration of 1 s separating two signals 210 and 220, the uncertainty in the estimation of the number of periods of the local clock 100 corresponds at worst to a period of this local clock 100, namely ±Txo. This results both in a phase error ±Txo and an uncertainty in the estimation of the frequency of the local clock 100.

To this first phase error ±Txo must be added a second phase error ±DPPS related to the temporal accuracy of the reference signal of the satellite-based positioning system 200.

By way of example, the local clock 100 may have an operating frequency of the order of 20 Mhz, its period then being of the order of Txo=50 ns. Moreover, the uncertainty in the phase of the PPS reference signal of the satellite-based positioning system is typically of the order of DPPS=±40 ns. Thus, the phase error EP defined by the relation EP=±DPPS±Txo is, in the case presented, of the order of −90 ns<EP<+90 ns.

In order to improve the accuracy, a number n greater than or equal to unity, for example and nonlimitingly n=10, of successive PPS signals may be emitted by the satellite-based positioning system 200, the number $N_2$ being metered over this time interval of n seconds. The error in the estimation of the period (and therefore of the frequency) of the local clock 100 is then defined by the relation ±Txo/n and the error in the estimation of the phase of the reference signal PPS provided by the satellite-based positioning system is defined by the relation ±DPPS/n. In other words, the operation of gauging the frequency of the local clock 100, defined by the relation CF=EP/n indicates an error (or a drift) of the order of 9 ns/s i.e. of 10 μs after 1110 s.

Finally, the time-stamping module 300 makes provision for the operator 330 which provides a universal time UTC(t). To do this, the operator 330 makes provision for an input providing it with the date UTC(SPS) originating from the reference clock of the satellite-based positioning system which is provided to it upon a call to the satellite-based positioning system. A setting to zero of the first counter 310 is then performed by the satellite-based positioning system 200, a PPS signal 210, 220 is also dispatched by the satellite-based positioning system 200 to the second counter 320 (start) and the metering of $N_1$ and $N_2$ starts.

These metered data $N_1$ and $N_2$ are taken into account at the input of the operator 330 with the date UTC(SPS) corresponding to the last call to the satellite-based positioning system. The phase error EP and the frequency of the local clock 100 being measured before input into the operator 330, the latter is capable of calculating and of providing as output a universal time UTC(t). In particular, the sampling dates determined according to the time UTC(t) are known in an accurate manner. More accurately, the operator 330 determines the function $$UCT(t) = UTC(SPS) + \frac{N_1(t)}{N_2/n}$$

which is used throughout the duration of validity of the gauging, the case n=1 being more especially presented in FIG. 1.

The universal time UTC(t) is therefore maintained by the local clock 100 at the latest up to the end of the duration of validity of the gauging. For the duration of validity of the gauging, the satellite-based positioning system may therefore be turned off, the time UTC(t) being accurate enough.

When one wishes to perform a new acquisition (at the latest at the end of the duration of validity of the gauging) or for re-gauging the local clock 100, UTC(t) is reset to zero by the satellite-based positioning system 200 which provides a new date UTC(SPS) directly and also performs a reset to zero of $N_1$ and a new metering of $N_2$.

The number n chosen thus defines a duration of gauging of n seconds, during which duration the satellite-based positioning system must be on. Beyond this duration of n seconds necessary for gauging, the positioning system may be off, thus making it possible to save energy. When the positioning system is off, the drift of the local clock 100 continues. In order not to exceed a maximum error of 10 μs in the phase error EP for the duration of data acquisition, it is then necessary to turn the satellite-based positioning system on again to perform a new gauging.

In the case presented here by way of example, this new gauging must occur at the latest after a duration $t_c$=10 μs/(9 ns/s) i.e. around 18 minutes and 30 seconds. In other words, in the representative case presented here the satellite-based positioning system must be on for a duration of 10 s and may be off for more than 18 minutes without affecting the quality of the measurements performed. In the absence of this gauging of the local clock 100 to the satellite-based positioning system 200, this drift of 10 μs is typically achieved in one second with the oscillators used within the context of the present invention.

Thus, energy saving is possible since the satellite-based positioning system 200 may be off for the duration of validity of the gauging. This duration of validity of the gauging is related directly to the accuracy of the measurement as presented in the example hereinabove but also related to the variation in the temperature which affects the frequency of the local clock 100.

Ultimately, at the output of the time-stamping module 300 one thus has the sampling frequency $F_E$ of the local clock 100 as well as a very accurate value UTC(t) of the time elapsed since the start of the data acquisition. The sampling frequency $F_E$ and the time UTC(t) are provided by the time-stamping module 300 to a resampling module 400.

The originality of the present invention therefore lies in the fact that it is not necessary to have a satellite-based positioning system that is on for the entire duration of data acquisition. Hence, the local clock 100 is gauged to the satellite-based positioning system 200. The expression "gauging of the local clock 100 to the satellite-based positioning system 200" is understood to mean that both a gauging CF of the frequency of the local clock 100 to the satellite-based positioning system 200 and a gauging of the time of the local clock 100 to the satellite-based positioning system 200 are performed, gauging thus providing a universal time UTC(t).

FIG. 2 presents a device for compensating phase error and sampling frequency. This device comprises the local clock 100, the satellite-based positioning system 200 and the time-stamping module 300 that are presented in FIG. 1, the time-stamping module 300 at whose output the sampling frequency FE, the time UTC(t) and therefore the quantity $N_1$ are provided to the resampling module 400.

The sampling frequency $F_E$ is dispatched to the resampling module 400 which moreover stores in a first memory 401 acquisition data emanating from an analog/digital converter 510 of the sensor 500. The memory 401 therefore contains acquisition data E[k] sampled with the frequency that is provided directly by the local clock 100, that is to say data sampled in a somewhat inaccurate manner. Moreover, the universal time UTC(t) emanating from the time-stamping module 300 is dispatched to a second memory 403 of the resampling module 400 which therefore stores the dates UTC ($t_k$) of the samples E[k], the latter dates being known accurately.

The resampling module 400 also comprises a resampler 404, and an interpolation filter 412 calculated dynamically on the basis of a reference filter 411.

The determination of the interpolation filter 412 is obtained by linear interpolation of the reference filter 411. More accurately, the interpolation filter is a series of coefficients which is calculated by the linear interpolation of a series of reference coefficients forming the reference filter 411. The calculation of the interpolation filter 412 must be done dynamically for each sample E[k] of the series of samples E[k], that is to say it is recalculated for each sample $E_k$ to be interpolated.

The interpolation filter 412 comprises a first input bringing the data from the second memory 403, a second input which links said filter 412 to the reference filter 411 and an output linking it to the resampler 404. Moreover, the first memory 401 is also linked to the resampler 404.

During a data acquisition, the resampling process is enabled. The resampler 404 determines where a data to is situated with respect to the samples emanating from the first memory 401. By virtue of the data provided by the interpolation filter 412, the resampler 404 is then able to perform an interpolation between two samples with indices k and (k+1), emanating from the memory 401, that are closest in time to the date $t_0$ (cf. FIG. 3).

The interpolation filter 412 is calculated on the basis of the reference filter and the temporal information emanating from the second memory 403, thus making it possible to retrieve the sampling instants UTC($t_k$) corresponding to the samples stored in the first memory 401. This interpolation filter 412 is then used by the resampler 404 to interpolate or filter the samples E[k] and to obtain samples S[k]. More accurately, to obtain an interpolated sample $S_k$ at the output of the resampler 404, it is necessary to apply the interpolation filter 412 to the resampler 404, over N samples $E_k$ which are in the first memory 401, N being the number of coefficients of the interpolation filter 412.

Thus, the interpolation carried out by the resampler 404 is performed by means of the interpolation filter 412, which is itself obtained by a linear interpolation of the reference filter 411 on the basis of the data emanating from the second memory 403.

At the output of the resampler 404 a buffer memory 405 is used to store the data to be sent to other apparatuses forming nodes of the wireless network.

FIGS. 3a and 3b present a principle of operation of the resampler 404 on acquisition data and is intended to elucidate the description given hereinabove.

In FIG. 3a, the curve 700 represents an acquisition curve for data emanating from the sensor 500, whose samples $E_k$ 710 forming the series E[k] are tapped off at a frequency corresponding to the frequency of the local clock 100. The resampler 404 interpolates the two samples $E_k$ and $E_{k+1}$ that are closest in time to the date to to form a new sample $S_0$ whose phase error is compensated. This resampling operation is performed identically for each date $t_k$, therefore for the formation of each new sample $S_k$. Ultimately, the resampler 404 transforms a series of samples E[k] into a new series of samples S[k] in which the sampling frequency and the phase error are both compensated.

More accurately, the series of samples E[k] is transformed into a new series of samples S[k] by means of the reference filter 411 and interpolation filter 412 included in the resampler 404. To obtain the series of samples S[k], the coefficients of the interpolation 820 are applied to the samples $E_k$ 710, the coefficients of the interpolation filter 820 being themselves obtained by interpolation of the coefficients of the reference filter 810, as shown by FIG. 4b. This operation is performed for each sample $E_k$, that is to say the coefficients of the interpolation filter 820 are recalculated on the basis of the coefficients of the reference filter 810 so as to provide each of the samples $S_k$ of the series of samples S[k], sample by sample.

In this method, the quantity of coefficients of the reference filter 411 is sufficient for the linear interpolation of this reference filter 411, making it possible to prevent the interpolation filter 412 from causing any distortion of the signal.

This resampling method may be performed as a continuation of the methods of gauging by the means 100, 200, 300 and of acquisition of data by the sensor 500. It may also well be carried out by post-processing, bearing in mind that all the data necessary for the resampling are stored in the memory 401. It is therefore possible to choose the moment at which the resampling method is carried out.

Moreover, to perform the gauging, an alternate embodiment to that described in support of FIG. 1 may be envisaged.

Specifically, it is possible to make provision for another type of counter instead and in place of the counter 320 of FIG. 1 which, instead of minimizing the error in the determination of the frequency of the local clock 100 according to the relation ±Txo/n, eliminates this error ±Txo.

To do this, this counter comprises an input linked to the reference clock of the satellite-based positioning system 200 and another input linked to the local clock 100, this being in accordance with the counter 320 of FIG. 1. However, unlike the counter 320 of FIG. 1, this counter waits for the reference clock and the local clock 100 to be aligned, that is to say for an edge of the reference clock (start/end of clock period) and an edge of the local clock 100 to occur on the same date in order to start the metering of the number $N_3$ of periods of the local clock 100 between two alignments of the reference clock and of the local clock 100.

In this alternate embodiment, this device makes it possible to reduce the uncertainty in measurement related to the accuracy of the reference clock by removing the counting uncertainty ±Txo.

It is not compulsory for the frequencies of the reference clock of the satellite-based positioning system and of the local clock 100 to be identical, but they are preferably similar so that the occurrence of a common signal (alignment) shared by the two clocks occurs as rapidly as possible.

This metering of $N_3$ continues until a signal of the two clocks occurs again on one and the same date, the date at which the metering of $N_3$ is stopped (stop). The ratio between the metering $N_3$ over the time separating two alignments of the clock then provides a measurement of the sampling frequency of the local clock 100. Once this sampling frequency has been determined, it is dispatched to the resampling module 400 and follows the same method of processing described in support of FIGS. 2 and 3. The accuracy of the measurement is related directly to the measurement time; it is therefore possible to impose a minimum duration of measurement before stopping the metering of $N_3$ at a temporal matching of the edges of the reference clock and of the local clock 100 to be measured.

The invention claimed is:

1. Method of data acquisition comprising the steps of:
sampling acquisition data at an imperfect sampling frequency $F_E$ provided by a local clock (100), thus forming a series of sampled and dated data E[k] having a time provided by the local clock (100);
measuring the frequency error of the local clock (100) by determining the sampling dates according to a universal time UTC(t) and gauging the local clock (100) to a reference clock of a satellite-based positioning system (200); and
collecting the sampled and dated data E[k] and turning on the satellite-based positioning system (200) so as to perform the gauging of the local clock (100); turning off the satellite-based positioning system (200) once the gauging of the local clock (100) has been performed; keeping the satellite-based positioning system (200) in the off state for the duration of validity of the gauging of the local clock (100).

2. Method according to claim 1, in which the step of gauging of the local clock (100) comprises the steps of:
metering in a first counter (310) of a time-stamping module (300) the number $N_1$ of periods of the local clock (100) from a date UTC(SPS) provided by the reference clock of the satellite-based positioning system (200);
determining in a second counter (320) of the time-stamping module (300) the frequency of the local clock (100) by gauging of the frequency of the local clock (100) to the frequency of the reference clock of the satellite-based positioning system (200);
providing an operator (330) of the time-stamping module (300) with the data emanating from the counters (310) and (320) and the date UTC(SPS) so as to determine the sampling dates according to the universal time UTC(t).

3. Method according to claim 2, comprising a step of:
calculating the universal time UTC(t) obtained by gauging of the local clock (100) to the universal time of the reference clock of the satellite-based positioning system (200), the universal time UTC(t) thus corresponding to a local clock (100) corrected of its frequency drift and maintained for the duration of validity of the gauging.

4. Method according to claim 2, in which the step of determining the frequency of the local clock (100) is a step of:
metering at least once the number $N_2$ of periods of the local clock (100) between two successive signals provided and perfectly dated by the satellite-based positioning system (200), which comprises the reference clock.

5. Method according to claim 2, in which the step of determining the frequency of the local clock (100) is a step of:
metering at least once the number $N_3$ of periods of the local clock (100) between two successive alignments of the reference clock and of the local clock (100).

6. Method according to claim 1, in which the step of correcting the data of the series of sampled and dated data E[k] is a step of:

resampling and redating a series of sampled and dated data E[k] as a series of resampled and redated data S[k], that is to say in which the phase error and sampling frequency error are both compensated.

7. Method according to claim 1, comprising a step of:

storing the series of dated and sampled data E[k] at a sampling frequency $F_E$ which is that of the local clock (100);

storing the sampling dates determined according to the universal time UTC(t).

8. Method according to claim 7, comprising the steps of:

providing the stored series of sampled and dated data E[k] to a resampler (404);

providing interpolation corrective coefficients of the series of data E[k] to the resampler (404) so that the latter generates the resampled and redated data series S[k].

9. Method according to claim 8, comprising a step in which an interpolation filter (412) providing the corrective interpolation coefficients to the resampler (404) is calculated dynamically for each sample $S_k$ of the series of samples S[k] to be generated on the basis of a reference filter (411) and of the knowledge of the sampling dates determined according to the universal time UTC(t).

10. Method according to claim 1, comprising steps of:

transmitting to the resampler (404) the frequency of the local clock (100) corresponding to the sampling frequency $F_E$;

transmitting to the resampler (404) the sampling dates determined according to the universal time UTC(t).

11. Data acquisition apparatus, characterized in that it comprises an analog/digital converter (510) sampling at an imperfect frequency $F_E$ provided by a local clock (100) data acquired by a sensor (500) thus providing a series of sampled and dated data E[k] having a time provided by the local clock (100), a time-stamping module (300) for measuring the frequency error of the local clock (100) by determining the sampling dates according to a universal time UTC(t), a satellite-based positioning system (200) including a reference clock, the time-stamping module (300) being able to gauge the local clock (100) to the reference clock of the satellite-based positioning system (200), a resampling module (400) for correcting the sampled and dated data E[k], and a means for correcting the sampled and dated data E[k], turning on the satellite-based positioning system (200) so as to perform the gauging of the local clock (100), turning off the satellite-based positioning system (200) once the gauging of the local clock (100) has been performed and keeping the satellite-based positioning system (200) in the off state for the duration of validity of the gauging of the local clock 100.

12. Data acquisition apparatus according to claim 11, characterized in that it comprises the resampling module (400) is able to generate, on the basis of a series of sampled and dated data E[k], a series S[k] of resampled and redated data, that is to say in which the phase error and sampling frequency error of the series of data E[k] are both compensated.

13. Apparatus according to claim 11, characterized in that the resampling module (400) comprises a first memory (401) storing the series of data E[k] dated and sampled at a frequency $F_E$ corresponding to the frequency of a local clock (100), and in that it comprises a second memory (403) storing the sampling dates determined according to the universal time UTC(t).

14. Apparatus according to claim 13, characterized in that the resampling module (400) comprises a resampler (404) linked on the one hand to a first memory (401) containing the samples E[k] and linked on the other hand to an interpolation filter (412), said interpolation filter (412) itself being linked to a second memory (403) containing the sampling dates determined according to the time UTC(t) and linked also to a reference filter (411) through which the interpolation filter (412) is dynamically calculated for each sample E[k] of a series of samples S[k] to be calculated, pg,20 said interpolation filter (412) thus generating the corrective interpolation coefficients making it possible to generate the series of data S[k] within the resampler (404).

15. Apparatus according to claim 11, characterized in that it forms a node of a data acquisition network.

* * * * *

UNITED STATES PATENT AND TRADEMARK OFFICE
CERTIFICATE OF CORRECTION

| | |
|---|---|
| PATENT NO. | : 7,548,600 B2 |
| APPLICATION NO. | : 11/268738 |
| DATED | : June 16, 2009 |
| INVENTOR(S) | : Jérôme Laine and Jean-Paul Menard |

Page 1 of 1

It is certified that error appears in the above-identified patent and that said Letters Patent is hereby corrected as shown below:

In claim 12, column 10, line 13, delete the word "is".

In claim 14, column 10, line 34, delete the phrase "pg. 20".

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,548,600 B2  
APPLICATION NO. : 11/268738  
DATED : June 16, 2009  
INVENTOR(S) : Jerome Laine et al.

Page 1 of 1

It is certified that error appears in the above-identified patent and that said Letters Patent is hereby corrected as shown below:

In the Claims:

Claim 1, Col. 8, line 27 should read:

-- ~~collecting~~ correcting the sampled and dated data E[k] and turning on --

Signed and Sealed this  
Ninth Day of July, 2013

Teresa Stanek Rea  
*Acting Director of the United States Patent and Trademark Office*